United States Patent
Sah et al.

(10) Patent No.: US 8,406,945 B2
(45) Date of Patent: Mar. 26, 2013

(54) METHOD AND APPARATUS TO CONTROL LOGIC VALVES FOR HYDRAULIC FLOW CONTROL IN AN ELECTRO-MECHANICAL TRANSMISSION

(75) Inventors: Jy-Jen F. Sah, West Bloomfield, MI (US); Ali K Naqvi, White Lake, MI (US); Michael D. Foster, Carmel, IN (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 1035 days.

(21) Appl. No.: 12/249,342

(22) Filed: Oct. 10, 2008

(65) Prior Publication Data
US 2009/0112422 A1 Apr. 30, 2009

Related U.S. Application Data

(60) Provisional application No. 60/982,765, filed on Oct. 26, 2007.

(51) Int. Cl.
*B60L 11/00* (2006.01)
*B60K 6/20* (2007.10)

(52) U.S. Cl. .................................. 701/22; 180/65.21

(58) Field of Classification Search ............... 701/22, 701/35, 208, 211, 213, 300; 180/65.21, 65.1–65.8; 340/995.1, 995.19; 903/930; 30/995.1, 995.19
See application file for complete search history.

(56) References Cited

U.S. PATENT DOCUMENTS

| | | | |
|---|---|---|---|
| 4,516,309 A * | 5/1985 | Clark ........................... 29/564.4 |
| 5,510,687 A * | 4/1996 | Ursworth et al. ............. 318/727 |
| 6,026,921 A | 2/2000 | Aoyama |
| 6,269,637 B1 * | 8/2001 | Motomura et al. ............. 60/399 |
| 6,832,148 B1 | 12/2004 | Bennett |
| 6,868,318 B1 | 3/2005 | Cawthorne |
| 7,154,236 B1 | 12/2006 | Heap |
| 2003/0144818 A1 * | 7/2003 | Kasuya et al. ................. 702/185 |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0082098 A1 | 4/2005 | Ito |
| 2005/0092113 A1 * | 5/2005 | Saito et al. ................... 73/865.9 |
| 2005/0182526 A1 | 8/2005 | Hubbard |
| 2005/0182543 A1 | 8/2005 | Sah |

(Continued)

FOREIGN PATENT DOCUMENTS
WO WO-2006-137586 * 12/2006
WO WO-2006137586 A1 12/2006

(Continued)

*Primary Examiner* — James Trammell
*Assistant Examiner* — Muhammad Shafi

(57) ABSTRACT

A method for controlling an electromechanical transmission includes monitoring a current hydraulic circuit oil temperature, monitoring a current state of flow management valves, monitoring a command for cooling of electric machines, monitoring a desired transmission operating range state, utilizing a state machine to determine a sequence for controlling positions of the flow management valves to achieve the desired transmission operating range state based upon the monitored properties.

9 Claims, 7 Drawing Sheets

U.S. PATENT DOCUMENTS

| | | |
|---|---|---|
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194566 A1* | 8/2006 | Oesterling ............... 455/404.1 |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287252 A1* | 11/2008 | Kaya et al. ............... 477/4 |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Hsieh |
| 2009/0118925 A1 | 5/2009 | Hsieh |
| 2009/0118926 A1 | 5/2009 | Heap |

| | | | | | | |
|---|---|---|---|---|---|---|
| 2009/0118927 A1 | 5/2009 | Heap | | 2009/0118949 A1 | 5/2009 | Heap |
| 2009/0118928 A1 | 5/2009 | Heap | | 2009/0118950 A1 | 5/2009 | Heap |
| 2009/0118929 A1 | 5/2009 | Heap | | 2009/0118951 A1 | 5/2009 | Heap |
| 2009/0118930 A1 | 5/2009 | Heap | | 2009/0118952 A1 | 5/2009 | Heap |
| 2009/0118931 A1 | 5/2009 | Kaminsky | | 2009/0118954 A1 | 5/2009 | Wu |
| 2009/0118932 A1 | 5/2009 | Heap | | 2009/0118957 A1 | 5/2009 | Heap |
| 2009/0118933 A1 | 5/2009 | Heap | | 2009/0118962 A1 | 5/2009 | Heap |
| 2009/0118934 A1 | 5/2009 | Heap | | 2009/0118963 A1 | 5/2009 | Heap |
| 2009/0118935 A1 | 5/2009 | Heap | | 2009/0118964 A1 | 5/2009 | Snyder |
| 2009/0118936 A1 | 5/2009 | Heap | | 2009/0118969 A1 | 5/2009 | Heap |
| 2009/0118937 A1 | 5/2009 | Heap | | 2009/0118971 A1 | 5/2009 | Heap |
| 2009/0118938 A1 | 5/2009 | Heap | | 2009/0118999 A1 | 5/2009 | Heap |
| 2009/0118939 A1 | 5/2009 | Heap | | 2009/0137361 A1 | 5/2009 | Matsubara |
| 2009/0118940 A1 | 5/2009 | Heap | | 2009/0139686 A1 * | 6/2009 | Suzuki .................... 165/42 |
| 2009/0118941 A1 | 5/2009 | Heap | | 2009/0144002 A1 | 6/2009 | Zettel |
| 2009/0118942 A1 | 5/2009 | Hsieh | | 2010/0041511 A1 * | 2/2010 | Tabata et al. ............. 477/3 |
| 2009/0118943 A1 | 5/2009 | Heap | | | | |
| 2009/0118944 A1 | 5/2009 | Heap | | | | |

FOREIGN PATENT DOCUMENTS

| | | | |
|---|---|---|---|
| WO | WO-2007049516 | * | 3/2007 |
| WO | WO-2007049681 A1 | | 5/2007 |

2009/0118945 A1 5/2009 Heap
2009/0118946 A1 5/2009 Heap
2009/0118947 A1 5/2009 Heap
2009/0118948 A1 5/2009 Heap

* cited by examiner

METHOD AND APPARATUS TO CONTROL LOGIC VALVES FOR HYDRAULIC FLOW CONTROL IN AN ELECTRO-MECHANICAL TRANSMISSION

CROSS REFERENCE TO RELATED APPLICATIONS

This application claims the benefit of U.S. Provisional Application No. 60/982,765 filed on Oct. 26, 2007 which is hereby incorporated herein by reference.

TECHNICAL FIELD

This disclosure pertains to control systems for electromechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying a hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can carry before the clutch slips.

The hydraulic control system, as described above, utilizes lines charged with hydraulic oil to selectively activate clutches within the transmission. However, the hydraulic control system is also known to perform a number of other functions in a hybrid powertrain. For example, an electric machine utilized within a hybrid powertrain generates heat. Known embodiments utilize hydraulic oil from the hydraulic control system in a continuous flow to cool the electric machine in a base machine cooling function. Other known embodiments additionally are known to react to higher electric machine temperatures with a selectable or temperature driven active machine cooling function, providing additional cooling in the high temperature condition. Additionally, known embodiments utilize hydraulic oil to lubricate mechanical devices, such as bearings. Also, hydraulic circuits are known to include some level of internal leakage.

Hydraulic oil is known to be pressurized within a hydraulic control system with a pump. The pump is preferably mechanically driven. In addition to this first main hydraulic pump, hydraulic control systems are known to also include an auxiliary hydraulic pump, preferably powered electrically and used when the mechanically driven pump is unavailable. The internal impelling mechanism of a pump rotates or operates at some speed, drawing hydraulic oil from a return line and pressurizing the hydraulic control system. The supply of hydraulic flow by the pump or pumps is affected by the speed of the pumps, the back pressure exerted by the hydraulic line pressure ($P_{LINE}$), and the temperature of the hydraulic oil ($T_{OIL}$).

Selective application of a flow of hydraulic fluid to functions served by the hydraulic control system requires valves or switches to apply or release the flow to the functions. Hydraulic valves are known in a variety of configurations in the art. Two known configurations include an electrically-actuated pressure control solenoid (PCS), wherein a valve internal to the PCS is translated, rotated, or otherwise moved by electromagnetic-mechanical means and is capable of a plurality or linearly variable actuation providing some fraction of a supplied line pressure; and a hydraulically-actuated flow management valve, wherein a valve internal to the flow management valve is translated, rotated, or otherwise moved by selective application of a command pressure and actuates between distinct states, for example, between two positions.

Utilizing a series of PCS valves and flow management valves to control a powertrain through complex operations can be difficult. A separate switch can be assigned to each individual function served by the hydraulic control system. However, such a system can be cost prohibitive and create increasing warranty concerns. Multi-level control systems are known, wherein a first set of valves controls flow to a second set of valves, and the multiplicity of settings between the different levels of valves can serve multiple functions with fewer physical valves. However, this coordinated valve action requires careful control, as a delay in actuation of a valve or some other malfunction can create unexpected or undesirable results in the operation of the powertrain.

A method to control multi-level hydraulic control valves within a transmission, insuring timely and accurate control of the functions served by the valves, would be beneficial.

SUMMARY

A method for controlling an electromechanical transmission comprising first and second electric machines and a hydraulic circuit having a plurality of flow management valves and pressure control solenoids operative to actuate a plurality of clutches and a plurality of pressure monitoring devices adapted to monitor the hydraulic circuit the transmission operative in fixed gear and continuously variable operating range states through selective actuation of the clutches includes monitoring a current hydraulic circuit oil temperature, monitoring a current state of the flow management valves, monitoring a command for cooling of the electric machines, monitoring a desired transmission operating range state, utilizing a state machine to determine a sequence for controlling positions of the flow management valves to achieve the desired transmission operating range state based upon the current hydraulic circuit oil temperature, the current state of the flow management valves, the command for cooling of the electric machines, and the desired transmission operating range state, and controlling the flow management valves based upon the sequence.

BRIEF DESCRIPTION OF THE DRAWINGS

One or more embodiments will now be described, by way of example, with reference to the accompanying drawings, in which:

FIG. 9 depicts an XY command logic module, receiving inputs related to the requirements of functions served by the hydraulic control system and generating a desired XY output, describing a desired XY state or a configuration of an X-valve and a Y-valve which would best serve the input requirements, in accordance with the present disclosure; and FIG. 10 depicts a state machine module, receiving inputs regarding current valve settings, desired valve settings, and the desired operating range state and outputting X-valve and Y-valve commands, in accordance with the present disclosure.

DETAILED DESCRIPTION

Figure 1:
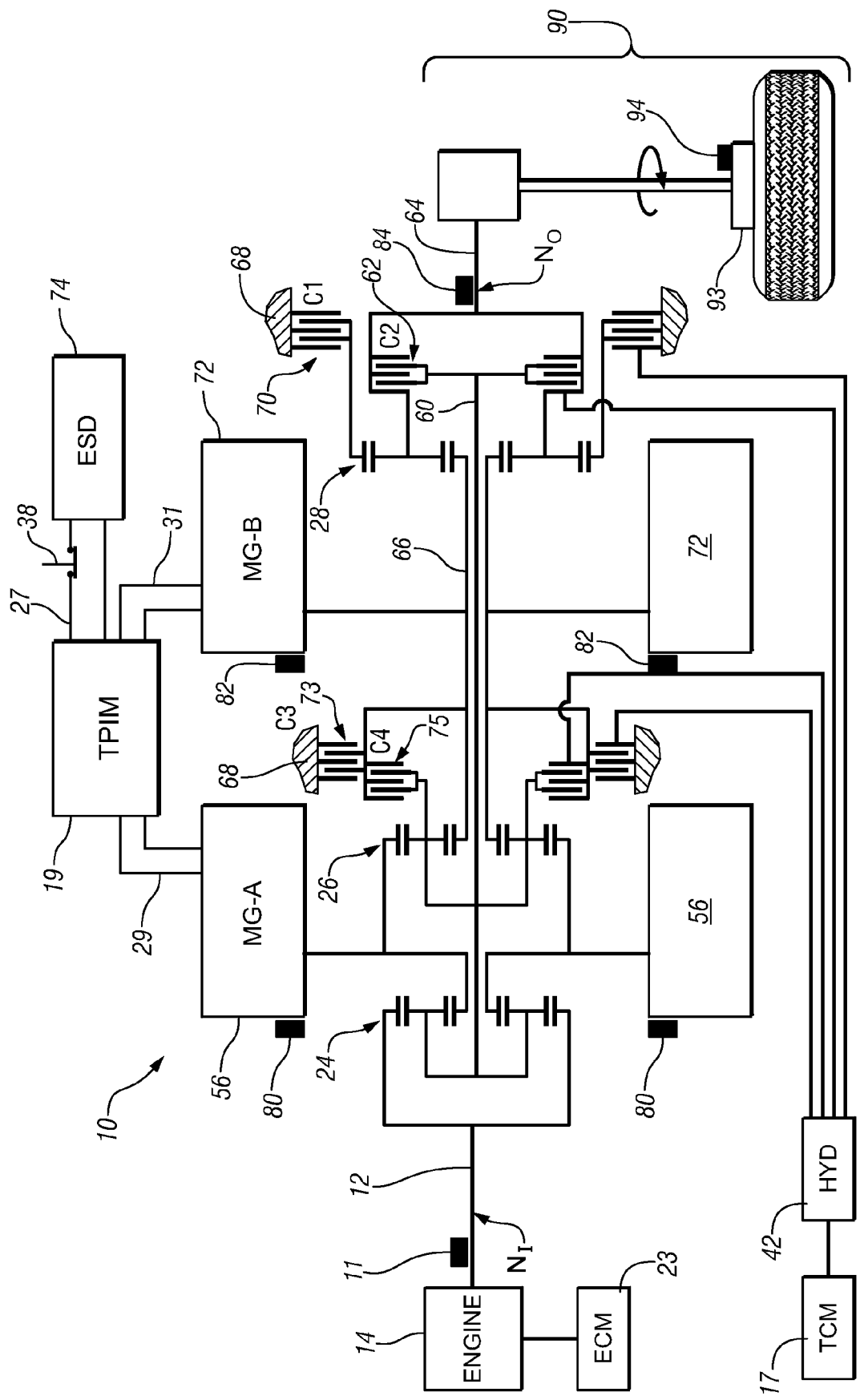
FIG. 1 is a schematic diagram of an exemplary powertrain, in accordance with the present disclosure.
Figure 2:
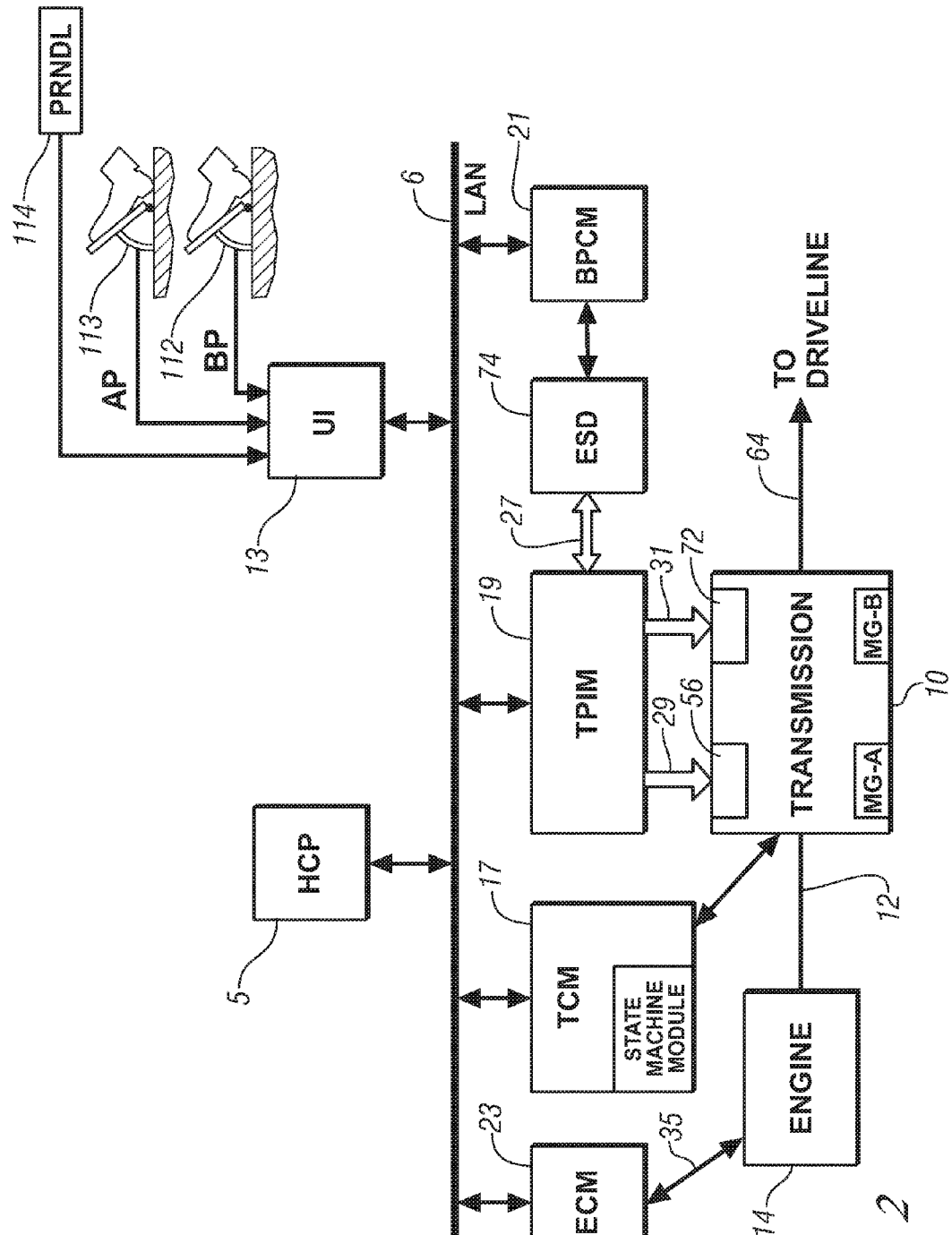
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to achieve the input torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary powertrain described in FIG. 1. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UT') 13 is operatively connected to a plurality of devices through which a vehicle operator controls or directs operation of the electromechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

Figure 3:
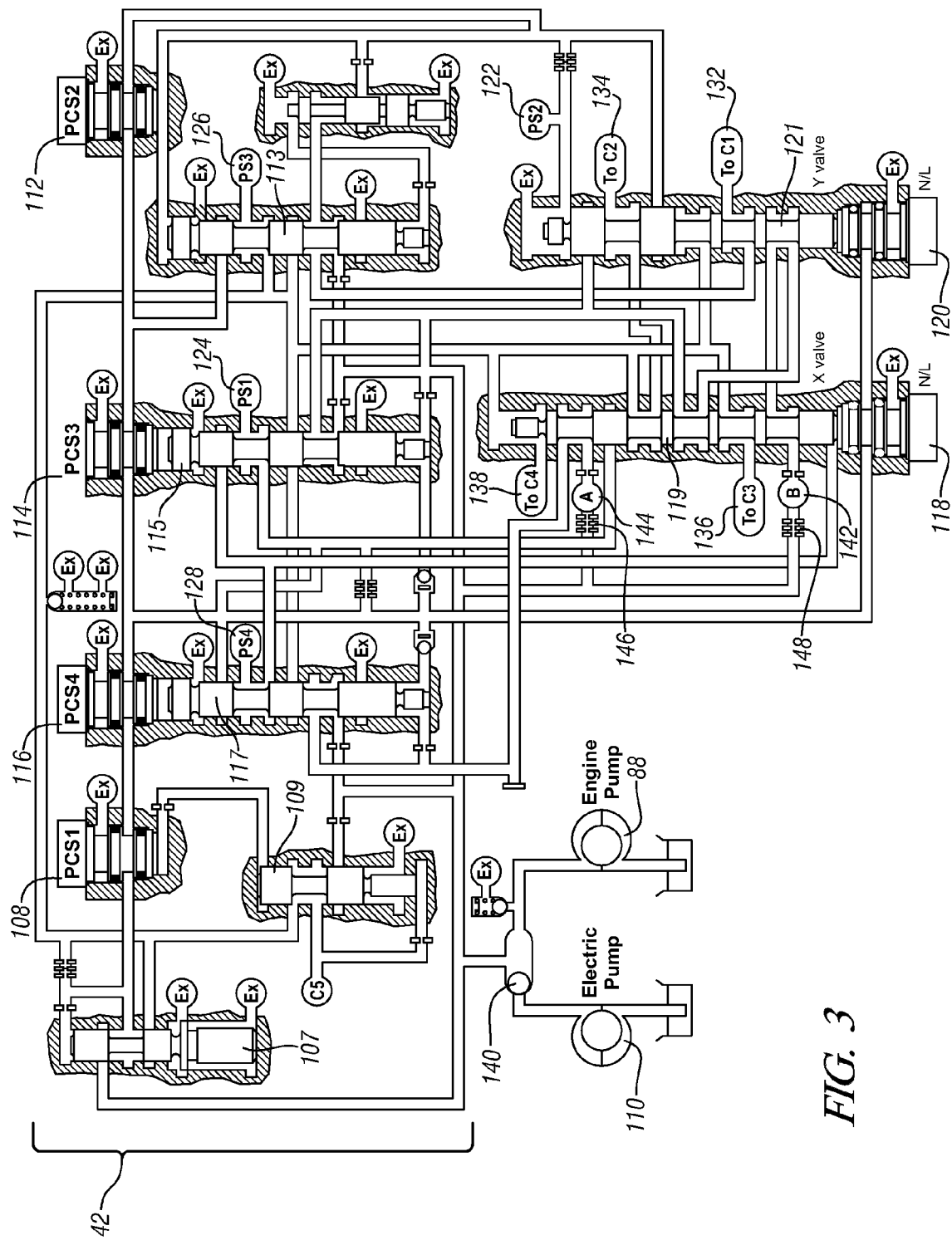
FIG. 3 is a schematic diagram of a hydraulic circuit, in accordance with the present disclosure.

FIG. 3 depicts a schematic diagram of the hydraulic control circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising electrically-actuated variable pressure control solenoids PCS1 108, PCS2 114, PCS3 112, PCS4 116 and solenoid-controlled hydraulically-actuated flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic control circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic No Latch | Y-Valve Logic C2 Latch | PCS1 Normal High | PCS2 Normal High | PCS3 Normal High | PCS4 Normal Low |
|---|---|---|---|---|---|---|
| EVT Mode I | 0 | 0 | Line Modulation | MG-B Stator Cool | C1 | MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first and second continuously variable modes and the first, second, and third fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2

63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

As described above and as described for the exemplary powertrain, for instance, in the functionality described in Table 2, a layer of flow management valves, the aforementioned exemplary X-valve and Y-valve, and a layer of PCS valves, PCS1 through PCS4, can be used to control a feed of pressurized hydraulic flow to functions served by the hydraulic control system. While such a configuration has benefits in efficiency, precise control of the combinations of valves is critical to insuring proper operation of the controlled powertrain.

Figure 4:
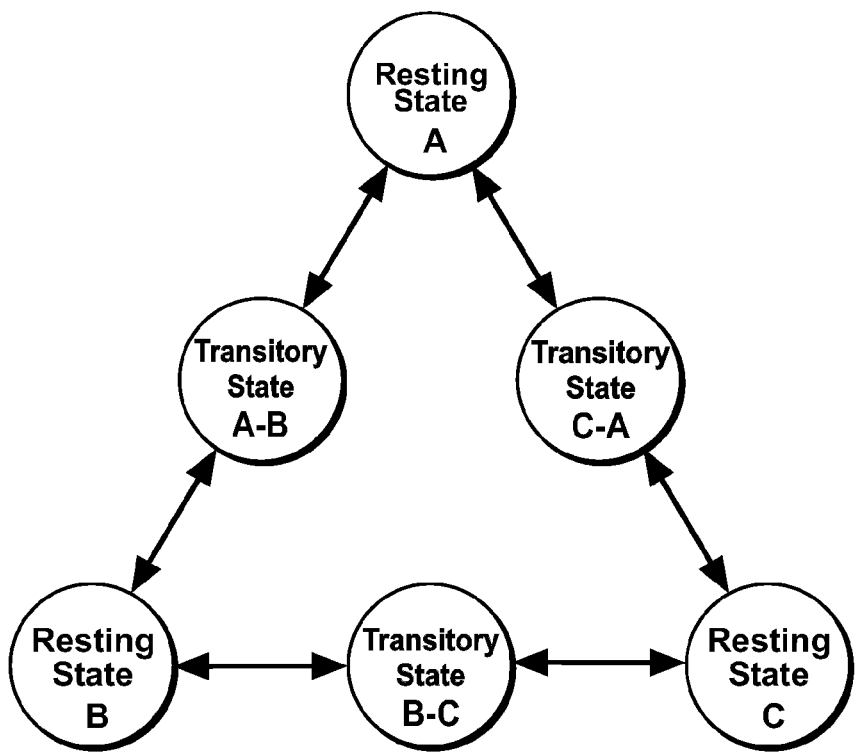
FIG. 4 graphically illustrates an exemplary state machine, in accordance with the present disclosure.

A finite state machine or a state machine is a method utilized in software and control applications, describing a decision making process in a complex system. State machines are used to emulate a system that can at anytime be described by being in a particular setting or state. Systems with discreet resting states and defined paths or decisions between the states can be described well by a state machine. Systems that operate in scalars or in non-discreet zones are not well described by a state machine. Transitions between resting states, if also performed in definable, discreet procedures can be defined as transitory states. FIG. 4 graphically illustrates an exemplary state machine, in accordance with the present disclosure. Six states are defined, including three resting states, resting states A, B, and C, and three transitory states, transitory states A-B, B-C, and C-A. The exemplary system described by the state machine can only exist in one of the six defined states. In addition to describing the six potential states that the system can exist in, the state machine can also describe the actions possible at any given state, as described by the arrows between the states. If the system is operating at resting state B, the system can take an action to go to transitory state A-B or to transitory state B-C. If the system is operating at transitory state C-A, the only action that the system can take is to go to resting state A. Operated in this way, a state machine can be used to describe systems operating in a series of discreet states, defining the status of the system and actions that the system may take.

A PCS valve can be operated in discreet states and discreet transition states. As described in Table 2 and in accompanying description, each PCS is said to be in a high state or a low state. Responding to commands, each PCS undergoes a discreet transition state from the high state to the low state or the reverse. Even when a PCS valve operates at some middle position, control of the valve can actuate the valve to the middle position as a semi-discreet state. Similarly, the X-valve and Y-valve is described in Table 2 as existing in a 0 state or a 1 state, describing each valve operating in discreet binary states.

Methods are known whereby transmission valves can be operated at intermediate states or states existing between the states at the ends of valve travel. An exemplary usage of such an intermediate state includes a PCS valve utilized to fill a clutch having a partial flow intermediate state enabling selection of a touching state in the clutch, wherein the clutch only receives partial line pressure to a calibrated level such that the engagement of the clutch stops short of fully compressing the clutch connective surfaces. One exemplary valve configuration allowing intermediate states includes direct control of an electrically-actuated valve, with a servo or similar mechanism utilizing feedback control well known in the art to drive the valve to a certain position based upon a command. Another exemplary valve configuration that allows such operation includes a flow management valve with a pressure feedback loop. According to normal hydraulically-actuated valve operation, a command pressure is applied to the valve, opening the valve such that full $P_{LINE}$ is applied to the clutch and the clutch pressure rises. However, the clutch pressure or some derivative thereof, manipulated by a restriction orifice or other means, is fed back and drives the valve to a particular position. Such a configuration is beneficial because it is directly controlled by clutch pressure and does not depend upon sensors and proper calibration of a control system. Such intermediate states can still be discreet and can still be modeled by state machines.

A method is disclosed to control a group of hydraulic valves using a state machine. As described above, hydraulic valves within a hydraulic control system control the functions served by the hydraulic control system. An exemplary control system making decisions regarding valve settings monitors requirements of the functions served, determines a priority among the requirements, determines a desired valve configuration to enable activation of the functions according to the determined priority, monitors a current valve configuration, and executes allowable or preferred valve transitions to reach the desired valve configuration.

Figure 5:
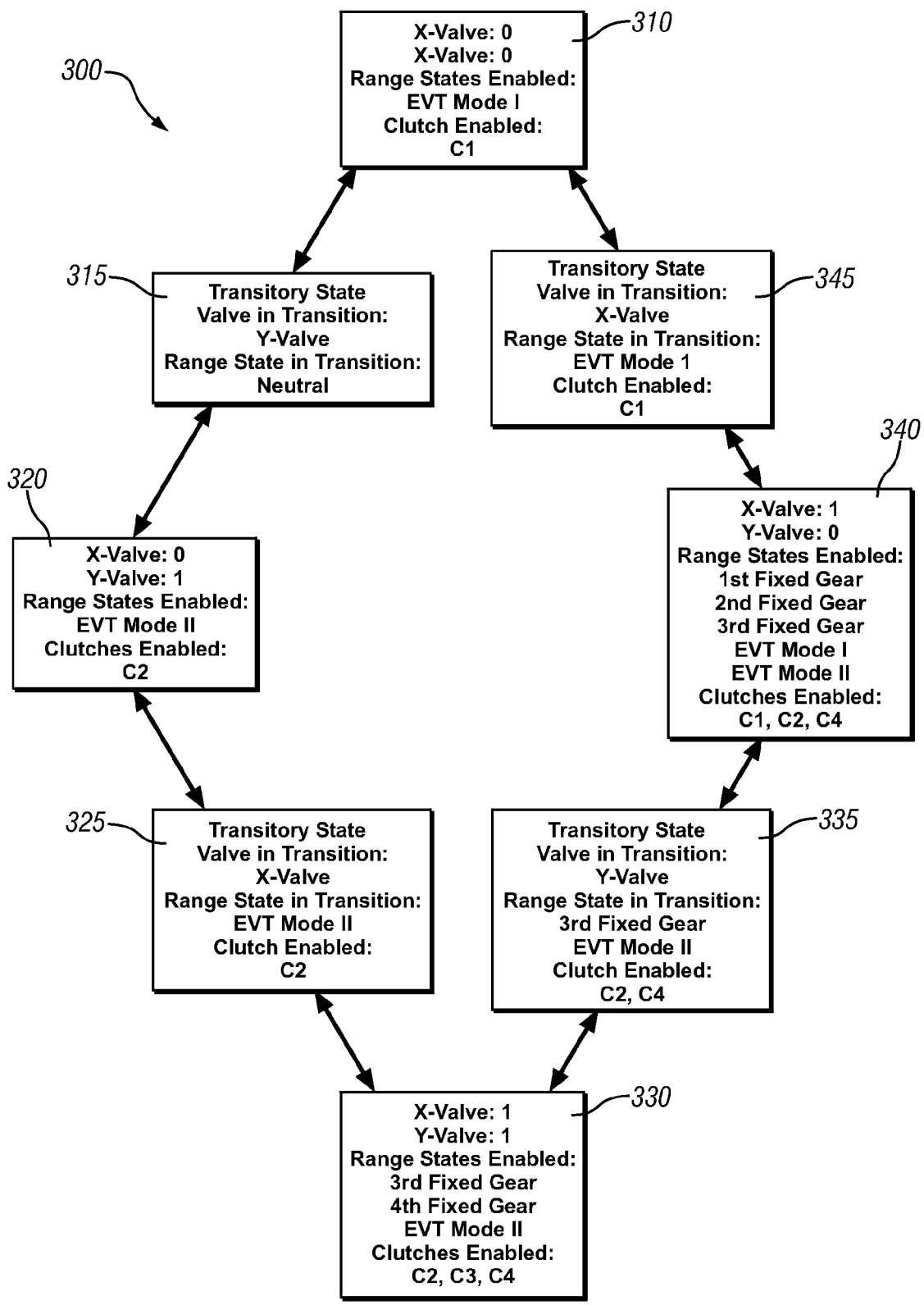
FIG. 5 graphically illustrates an exemplary state machine describing operation of an X-valve and a Y-valve, in accordance with the present disclosure.

Describing any system through a state machine requires an understanding of all possible states and transitions. FIG. 5 graphically illustrates an exemplary state machine describing operation of an X-valve and a Y-valve, according to the present disclosure. The X-valve, with two possible resting states, and the Y-valve, with two possible resting states, define four resting states in FIG. 5: state 310 wherein EVT Mode I only operation is enabled; state 320 wherein EVT Mode II only operation is enabled; state 330 defined in Table 2 as a high range; and state 340 defined in Table 2 as a low range. Each depicted state defines available or enabled clutches which can be engaged under the given X-valve and Y-valve configuration. State 310 allows for transmission of torque from the engine, the electric machines, or both with only clutch C1 engaged. As will be appreciated from FIG. 1, operation of the exemplary transmission including the planetary gear set with only clutch C1 engaged, the system is operable in EVT Mode I. As described in Table 2, state 310 also includes hydraulic flow to active cooling circuits to the two electric machines, allowing for robust operation of the powertrain under electrical power with full ability to manage heat in the electric machines. State 320 allows for transmission of torque from the engine, the electric machines, or both with only clutch C2 engaged. As will be appreciated from FIG. 1, operation of the exemplary transmission including the planetary gear set with only clutch C2 engaged, the system is operable in EVT Mode II. Similarly to state 310, state 320 also includes hydraulic flow to active cooling circuits to the two electric machines, allowing for robust operation of the powertrain under electrical power with full ability to manage heat in the electric machines. State 330 allows for transmission of torque from the engine, the electric machines, or both with any of clutches C2, C3, and C4 engaged. Operation with any of these clutches allows for operation in EVT Mode II with only clutch C2 engaged or in a third fixed gear or a fourth fixed gear with a combination of clutches engaged (reference Table 1, above). State 340 allows for transmission of torque from the engine, the electric machines, or both with any of clutches C1, C2, and C4 engaged. Operation with any of these clutches allows for operation in EVT Modes I or II or in a first, second, or third fixed gear.

Four transitory states are additionally defined in FIG. 5: states 315, 325, 335, and 345, defining permissible transitions between the resting states. In the exemplary embodiment of FIG. 5, and keeping in mind that the system being modeled is always in one of the eight defined states, the four transitory states are defined by either the X-valve or Y-valve being in transition. Operation of the powertrain through the transitory state is defined primarily by the valve not being transitioned, as this valve dictates which clutches can remain engaged through the transition. No transitory state changing both the X-valve and Y-valve is permitted. As described above, the system is always in one of the eight defined states, and the hydraulic flow through the system in a transition wherein both valves were changed would depend upon which valve changed first and would lead to unpredictable and potential harmful results. As a result, stable control of the system requires that only one valve be changed at a time. During transitory states 325, 335, and 345, the valve not transitioning enables at least one clutch to be engaged throughout the transition, thereby enabling transmission of torque through the transmission throughout operation in the transitory state. Only transitory state 315 transitions from state 310 wherein only clutch C1 is enable to state 320 wherein only clutch C2 is enabled. Because no clutch is operable in the transitory state, state 315 takes place only in a neutral range state with no torque being transmitted through the transmission.

A state machine modeling operation of a hydraulic control system and the valves therein is useful to compare various potential valve transition paths and select preferred valve transitions based upon the effects of the transitions to drivability, time to complete the shift, fuel efficiency, and other relevant factors.

Figure 6:
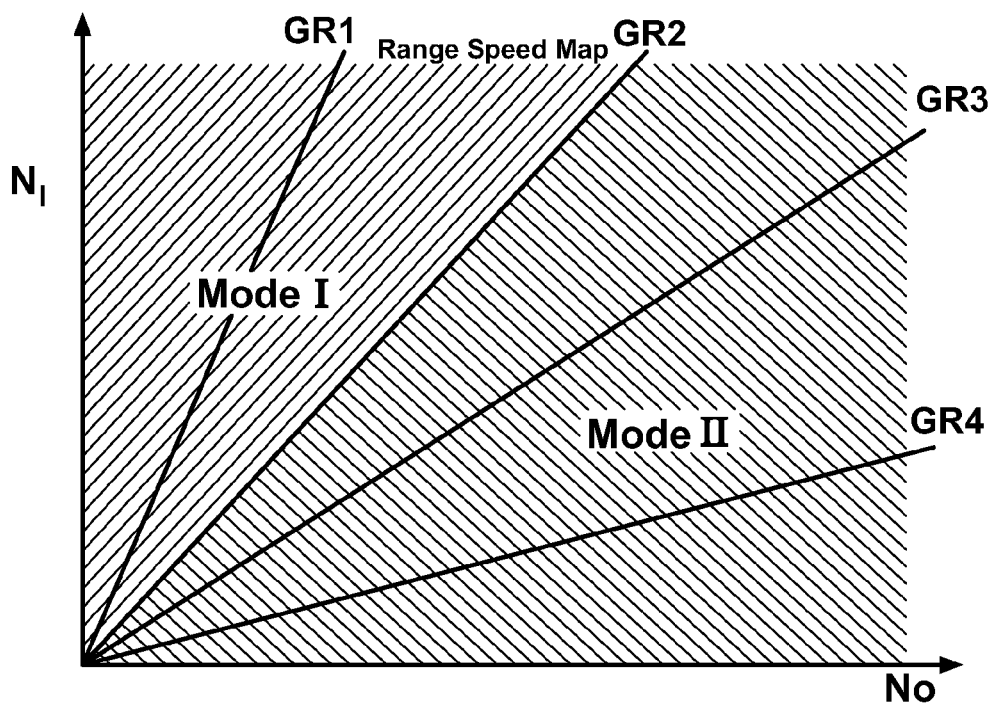
FIG. 6 graphically illustrates exemplary operation of a powertrain through various operating range states, information necessary to the configuration of the state machine of FIG. 5, in accordance with the present disclosure.

FIG. 5 illustrates states in which the exemplary transmission can exist and be transitioned through as a function of an X-valve and a Y-valve. Functions enabled by the various states are not randomly assigned, but rather fit into an overall control strategy for the powertrain. FIG. 6 graphically illustrates exemplary operation of a powertrain through various operating range states, information necessary to the configuration of the state machine of FIG. 5, in accordance with the present disclosure. $N_I$ is plotted against $N_O$, and the labeled lines and regions describe the relationship of $N_I$ to $N_O$ based upon the operating range state of the transmission. Lines GR1 through GR4 describe the fixed gear ratios for each of the respective fixed gear states, where the slope of the line describes the ratio achieved of $N_I$ to $N_O$. The two crosshatched sections describe the zones in which EVT Mode I and II are enabled. FIG. 6 also describes transitions possible between the various operating range states through engagement and disengagement of various clutches, relationships made more apparent through examination of Table 1, above. For example, as described above, EVT Mode I is operable with only clutch C1 engaged, and EVT Mode II is operable with only clutch C2 engaged. The second fixed gear (FG2) is operable with clutches C1 and C2 engaged. Returning to FIG. 6, the line representing the gear ratio of FG2 is located on the boundary between EVT Modes I and II. An exemplary method to transition between EVT Mode I and EVT Mode II is to transition through FG2. Any shift through neutral, wherein clutch C1 is disengaged prior to clutch C2 being engaged, causes an interruption in To, and, therefore, a shift through FG2 wherein C2 is engaged and then C1 is disengaged is preferred. Similarly, a shift between gears, for example, from FG 4 with clutches C2 and C3 engaged to FG3 with clutches C2 and C4 engaged, in order to avoid interruption in $T_O$, is preferably transitioned through EVT Mode II with clutch C2 engaged. In this way, transitions between operating range states are configured, with clutch transitions including preferential transitions enabled through selective clutch control design.

Arrangement of preferred clutch transitions is evident in the exemplary valve configuration described in FIG. 5. Operating range states located proximately to each other in FIG. 6 are grouped together in states 330 and 340, and transition between the two only requires a single transition through transitory state 335. Transition from operation in state 340 corresponding to a section of FIG. 6 to state 310 wherein active cooling of the electric machines is enabled only requires a single transition through transitory state 345. Where possible, transition through transitory state 315, with a corresponding shift through neutral, is preferably avoided. For example, with the system operating in state 310 and perceiving a need to go to state 330, a transition through state 340 is preferred to a transition through state 320 in order to avoid the shift through neutral in transitory state 315 and associated impact to drivability caused by the torque interruption.

Figure 7:
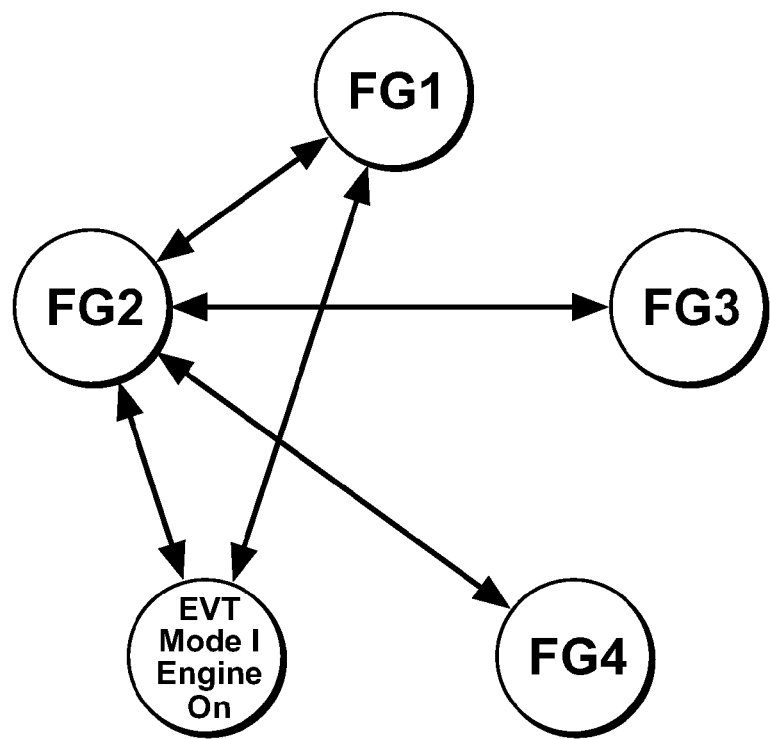
FIG. 7 is an exemplary state machine further describing permissible shifts between range states in an exemplary transmission, in accordance with the present disclosure.

FIG. 5 describes through a state machine transitions that are possible in an X-valve and Y-valve control configuration. FIG. 6 describes operating range state behaviors and implies structure to shifts between the range states. FIG. 7 is an exemplary state machine further describing permissible shifts between range states in an exemplary transmission, in accordance with the present disclosure. Actuation of multiple levels of valves to engage and disengage various clutches, combined with a limited number of valid operating range state clutch combinations and other vehicle operability requirements, creates priorities and prohibitions in shifts to operating range states. For example, a powertrain operating in FG1 can transition to either FG2 or EVT Mode I with the engine on. This transition is possible because, within the low range described by state 340 in FIG. 5, clutches C1 and C4 engaged in FG1 can be transitioned to sole activation of C1 consistent with EVT Mode I engine on or to FG2 by deactivating clutch C4 and activating clutch C2. However, from FG1, with clutches C1 and C4 engaged, a direct transition to FG3, with clutches C2 and C4 engaged, cannot be made. Clutches C1 and C2 cannot be transitioned, because clutch C4 engaged by itself is not a valid operating range state. Instead, a transition to FG2 must first be made, and then a transition to FG3 can be made. Such operating range state relationships stem from and are interdependent with any valve logic strategy such as the behavior described in FIG. 5. FIG. 7 presents an incomplete state machine describing operating ranges states and permissible transitions between range states for the purposes of illustration. It will be appreciated that additional permissible transitions exist within the exemplary transmission, but were not needed to describe the relationships illustrated in FIG. 7.

Figure 8:
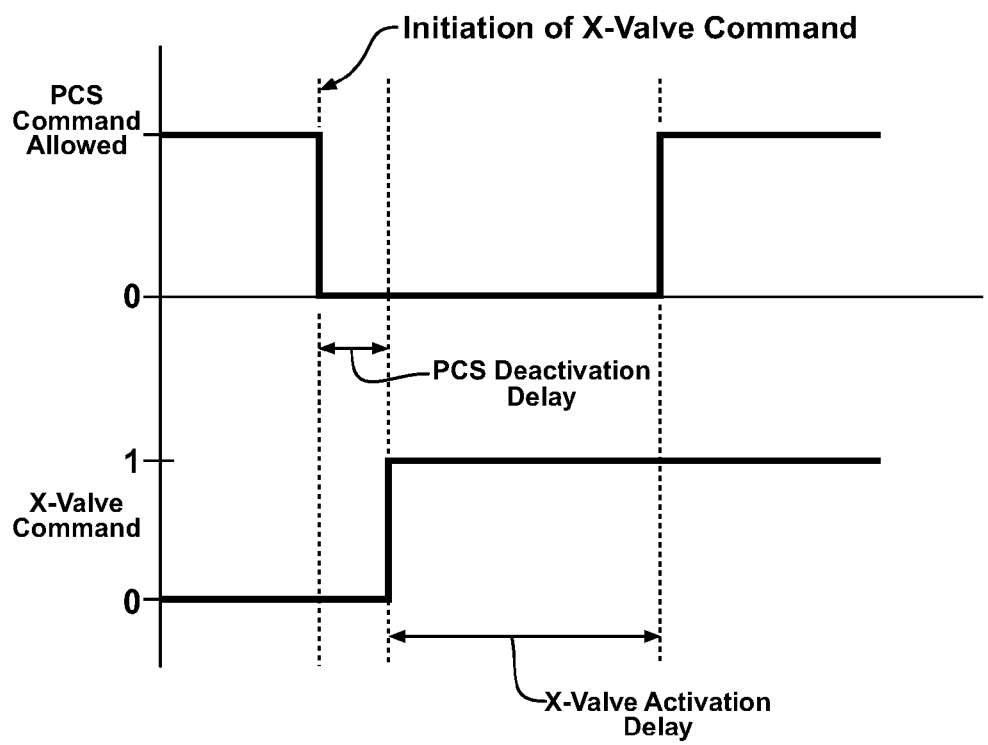
FIG. 8 graphically illustrates a PCS mute function, in accordance with the present disclosure.

As described above, multi-layered hydraulic valve designs utilized to control a transmission are efficient, allowing a reduction in the number of physical valves utilized, but careful control of the valves controlling the transmission must be kept to avoid logic errors in the hydraulic control. Different methods are known for transitioning between valve settings and through sequences of valve changes. Known strategies utilize sensors to directly sense shift changes and timing strategies to anticipate behaviors of a transmission through commanded shifts. However, use of multi-layer valve strategies in combination with multiple clutch planetary gear sets, as described above, creates increased dependence on precise actuation of hydraulic valves. A momentary overlap of unintended valve settings can cause unintentional clutch actuation and adverse effects to the powertrain. Use of a state machine such as the exemplary embodiment described in FIG. 5 to control valve changes avoids incorrect assumptions and allows error-proofing methods to implemented, insuring that unintended clutch activation or deactivation do not occur. For example, changes in X-valve and Y-valve settings, in order to account for slow valve actuation, can include a PCS mute function. FIG. 8 graphically illustrates a PCS mute function, in accordance with the present disclosure. Due to a change in inputs, an X-valve command is initiated to change X-valve state. In order to mute any unintended or accidental effects of hydraulic flow to functions served by the hydraulic control system, at the time the command to the X-valve is initiated, a mute function is imposed upon PCS command allowed such that the PCS must return to a default position. A PCS deactivation delay is allowed to expire in order to insure that the PCS valves have time to return to their default positions. The PCS deactivation delay can be a function of a number of variables, including affects of $T_{OIL}$, for example, on viscosity of the hydraulic oil. Once the PCS deactivation delay has expired, the X-valve can be allowed to change state. Again, a delay is implemented to account for the time required for the X-valve to change state. This delay, an X-valve activation delay, can be a function of a number of variables including $T_{OIL}$. Once the X-valve activation delay expires, the mute function upon the PCS command allowed is removed, and the PCS command, depending upon valve function, can return to normal levels.

While systems employing multi-layered valve strategies, depending upon relative timing of different valve for proper function, can benefit from the methods described herein, it will be appreciated that benefits can be derived using a state machine to control any hydraulic control system employing valves utilizing discreet valve states. For example, if the above system utilized a different valve for each clutch and each additional function served by the hydraulic control system, a state machine could still insure that a delayed valve did not cause a logic error in clutch control. Similarly, a state machine in such a system could serve as a fool-proofing method to prioritize active cooling of an electric machine versus clutch operation.

Figure 9:
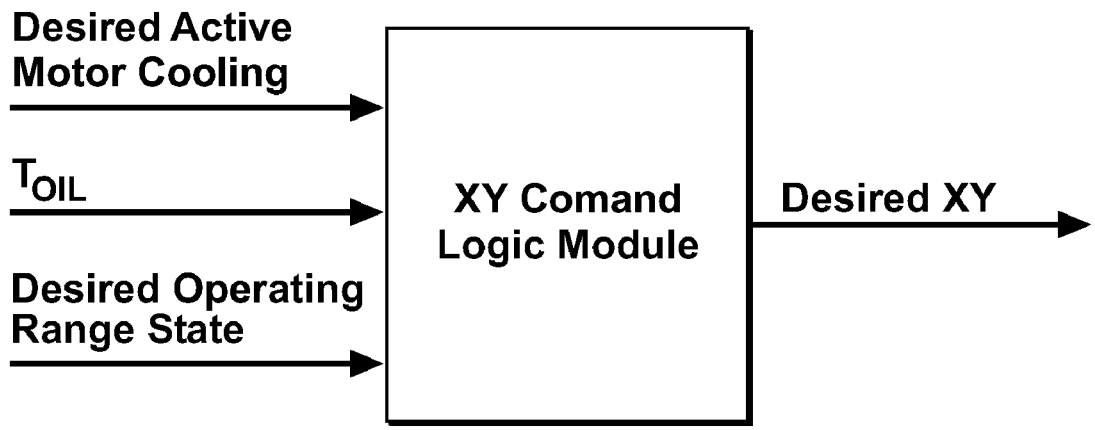
FIGS. 9 and 10 schematically depict an exemplary valve sequencing control modules, monitoring inputs related to control of a hydraulic control system and issuing commands to hydraulic control valves, in accordance with the present disclosure.
Figure 10:
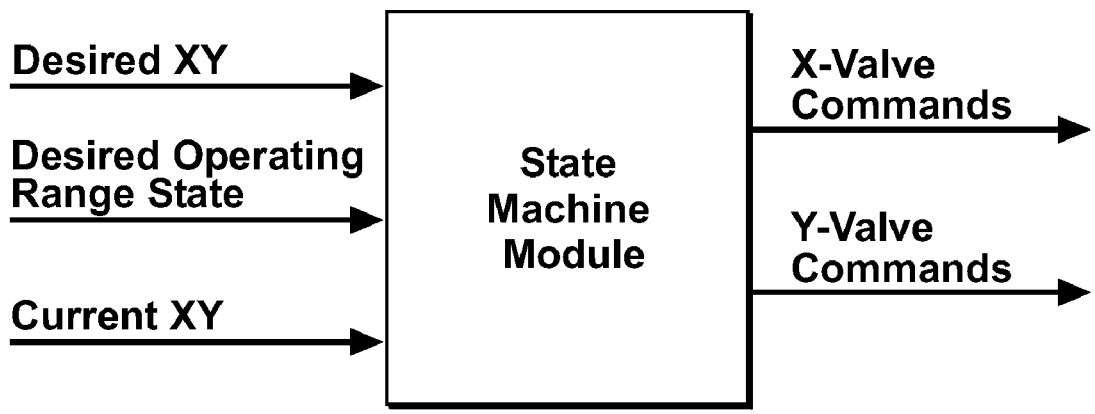

FIGS. 9 and 10 schematically depict an exemplary valve sequencing control modules, monitoring inputs related to control of a hydraulic control system and issuing commands to hydraulic control valves, in accordance with the present disclosure. FIG. 9 depicts an XY command logic module, receiving inputs related to the requirements of functions served by the hydraulic control system and generating a desired XY output, describing a desired XY state or a configuration of an X-valve and a Y-valve which would best serve the input requirements. Inputs described in the exemplary embodiment of FIG. 9 include desired active motor cooling, TOIL, and desired operating range state. Other exemplary inputs could include lubrication requirements, depending upon the configuration of the system. XY command logic module includes algorithms prioritizing inputs and determining which competing functions are more important to serve. For example, the algorithm can determine that particular clutch functions to accomplish a desired operating range state are more important than current needs for active motor cooling. FIG. 10 depicts a state machine module, receiving inputs regarding current valve settings, desired valve settings, and the desired operating range state and outputting X-valve and Y-valve commands. The state machine module employs analytical methods and algorithms programmed in accordance with methods described within this disclosure to determine appropriate X-valve and Y-valve resting states and transition states to affect desired control to the hydraulic control system. Although not shown, it should be appreciated that in addition to the desired valve settings and desired operating range states, a number of other inputs can be used to factor and limit decisions made by the state machine, including physical limits and properties and diagnostic mode settings. Diagnostic faults, for example indications of a stuck X-valve or Y-valve, can create an appropriate reaction, for example, freezing the state machine in the current state, or a remedial transition, for example, moving to a state generating a pressure pulse attempting to unfreeze a valve. As a result of all inputs, state machine module processes available information and either directly issues commands to the X-valve and Y-valve or signals appropriate instructions to a valve command module. The modules described above explain different functional characteristics of the control functions utilized; however, it will be understood that the modules can be incorporated in different unitary physical devices, in a single physical device, a module can itself span a number of physical devices; or both modules can be combined into a hydraulic control system control module.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling an electro-mechanical transmission comprising first and second electric machines and a hydraulic circuit having a plurality of flow management valves and pressure control solenoids operative to actuate a plurality of clutches and a plurality of pressure monitoring devices adapted to monitor said hydraulic circuit, said transmission operative in fixed gear and continuously variable operating range states through selective actuation of said clutches, the method comprising:

operating said hydraulic circuit as a multi-layered control system, wherein a first layer comprises said flow management valves selectively permitting a hydraulic flow to a hydraulic cooling circuit for said electric machines and to said clutches and a second layer comprises said pressure control solenoids varying pressure of said hydraulic flow;

monitoring a current hydraulic circuit oil temperature;

monitoring a current state of said flow management valves;

monitoring a command for cooling of said electric machines;

monitoring a selected transition from a current transmission operating range state to a desired transmission operating range state;

utilizing a state machine defining possible transitions for said flow management valves to determine a sequence for controlling positions of said flow management valves to achieve said desired transmission operating range state based upon said current hydraulic circuit oil temperature, said current state of said flow management valves, said command for cooling of said electric machines, and said desired transmission operating range state, wherein the utilizing said state machine to determine said sequence comprises, determining a desired state of said flow management valves based upon said desired transmission operating range state; and applying valve logic-based rules to determine said sequence for controlling positions of said flow management valves based upon said desired state of said flow management valves; and controlling said flow management valves based upon said sequence.

2. The method of claim 1, wherein the applying valve logic-based rules comprises:

comparing said desired state of said flow management valves to said current state of said flow management valves;

identifying possible transitions to actuate said flow management valves from said current state of said flow management valves to said desired state of said flow management valves; and prioritizing said possible transitions based upon said valve logic-based rules comprising evaluating permissible clutch transitions, evaluating effects to drivability, and balancing said command for cooling of said electric machines.

3. The method of claim 2, wherein the prioritizing said possible transitions further comprises evaluating diagnostic faults.

4. The method of claim 2, wherein said prioritizing said possible transitions further comprises evaluating interaction between said layers of said multi-layered control system.

5. The method of claim 4, wherein controlling said flow management valves based upon said sequence comprises actuating one of said flow management valves at a time.

6. The method of claim 4, further comprising utilizing a mute function upon one layer of said multi-layered control system during said controlling said flow management valves based upon said sequence.

7. An apparatus for controlling an electro-mechanical transmission comprising first and second electric machines and a plurality of hydraulically-actuated clutches, said transmission operative in fixed gear and continuously variable operating range states through selective actuation of said clutches, said apparatus comprising:

a hydraulic control system selectively directing a hydraulic flow to functions including actuation of said clutches and an electric machine cooling circuit, said hydraulic control system comprising a first control layer comprising flow management valves and a second control layer; and a hydraulic control system control module, including logic operations configured for monitoring requirements of said functions, monitoring a desired transmission operating range state, determining a desired valve configuration of said flow management valves based upon said requirements and said desired transmission operating range state, monitoring a current valve configuration of said flow management valves, and executing preferred valve transitions to reach said desired valve configuration based upon a state machine algorithm modeling potential valve transition paths between said current valve configuration and said desired valve configuration.

8. The apparatus of claim 7, wherein said second control layer comprises pressure control solenoids; and wherein said modeling by said state machine algorithm includes interactions between said first layer and said second layer.

9. The apparatus of claim 8, wherein said logic operation further comprise, during transitions in said first layer, muting related operations of said second layer.

* * * * *